(12) United States Patent
Brueschke et al.

(10) Patent No.: US 10,590,348 B2
(45) Date of Patent: Mar. 17, 2020

(54) SLURRY BUBBLE COLUMN REACTOR FOR A FISCHER-TROPSCH PROCESS

(71) Applicants: L'AIR LIQUIDE Société Anonyme pour l'Etude et l'Exploitation des Procédés Georges Claude, Paris (FR); The Petroleum Oil and Gas Corporation of South Africa (SOC) Ltd, Parow (ZA)

(72) Inventors: Marc Brueschke, Bad Homburg (DE); Patrick Otto Taylor, Mossel Bay (ZA); Pål Søraker, Trondheim (NO)

(73) Assignees: L'AIR LIQUIDE Société Anonyme pour l'Etude et l'Exploitation des Procédés Georges Claude, Paris (FR); The Petroleum Oil and Gas Corporation of South Africa (SOC) Ltd, Parow (ZA)

( * ) Notice: Subject to any disclaimer, the term of this patent is extended or adjusted under 35 U.S.C. 154(b) by 0 days.

(21) Appl. No.: 16/306,264

(22) PCT Filed: May 19, 2017

(86) PCT No.: PCT/EP2017/062084
§ 371 (c)(1),
(2) Date: Nov. 30, 2018

(87) PCT Pub. No.: WO2017/207299
PCT Pub. Date: Dec. 7, 2017

(65) Prior Publication Data
US 2019/0112532 A1 Apr. 18, 2019

(30) Foreign Application Priority Data
Jun. 2, 2016 (DE) .......................... 10 2016 110 237

(51) Int. Cl.
*B01J 8/18* (2006.01)
*C10G 2/00* (2006.01)
(Continued)

(52) U.S. Cl.
CPC .............. *C10G 2/344* (2013.01); *B01J 8/006* (2013.01); *B01J 8/1836* (2013.01); *B01J 8/22* (2013.01);
(Continued)

(58) Field of Classification Search
None
See application file for complete search history.

(56) References Cited

U.S. PATENT DOCUMENTS

| | | | | |
|---|---|---|---|---|
| 5,599,849 A | * | 2/1997 | Jager | ........................ B01J 8/006 518/700 |
| 8,013,025 B2 | | 9/2011 | Steynberg et al. | |
| 2009/0069450 A1 | | 3/2009 | Ibsen et al. | |

FOREIGN PATENT DOCUMENTS

| | | |
|---|---|---|
| EP | 0609079 | 8/1994 |
| WO | 2007041726 | 4/2007 |

(Continued)

OTHER PUBLICATIONS

Forret, A. et al. "Scale Up of Slurry Bubble Reactors" Oil & Gas Science and Technology—Rev. IFP, vol. 61 (2006), No. 3, pp. 443-458 (Year: 2006).*

(Continued)

*Primary Examiner* — Medhanit W Bahta
(74) *Attorney, Agent, or Firm* — Pauly, DeVries, Smith & Deffner LLC

(57) ABSTRACT

The disclosure deals with a slurry bubble column reactor for converting a gas mixture comprising carbon monoxide and hydrogen into liquid hydrocarbons. The slurry bubble column reactor features a slurry bed of catalyst particles, an (Continued)

inlet conduit for feeding the gas mixture into the slurry bed, a filtration zone for separating the liquid hydrocarbons from the catalyst particles and a liquid outlet conduit for withdrawing the separated hydrocarbons from the filtration zone. The filtration zone is situated in the slurry bubble column reactor such that the slurry bed is found in a first and a second heat exchange zone with the filtration zone arranged between the first and the second heat exchange zone.

10 Claims, 1 Drawing Sheet

(51) Int. Cl.
*B01J 8/22* (2006.01)
*B01J 8/00* (2006.01)
*C10G 31/09* (2006.01)

(52) U.S. Cl.
CPC ............. *C10G 2/341* (2013.01); *C10G 31/09* (2013.01); *B01J 2208/00115* (2013.01); *B01J 2208/00761* (2013.01); *C10G 2300/1022* (2013.01)

(56) References Cited

FOREIGN PATENT DOCUMENTS

| WO | 2012168830 | 12/2012 |
|----|------------|---------|
| WO | 2017207299 | 12/2017 |

OTHER PUBLICATIONS

International Search Report and Written Opinion for PCT Application No. PCT/EP2017/062084 dated Jul. 27, 2017 (8 pages).
International Preliminary Report on Patentability for PCT Application No. PCT/EP2017/062084 dated Dec. 13, 2018 (7 pages).

* cited by examiner

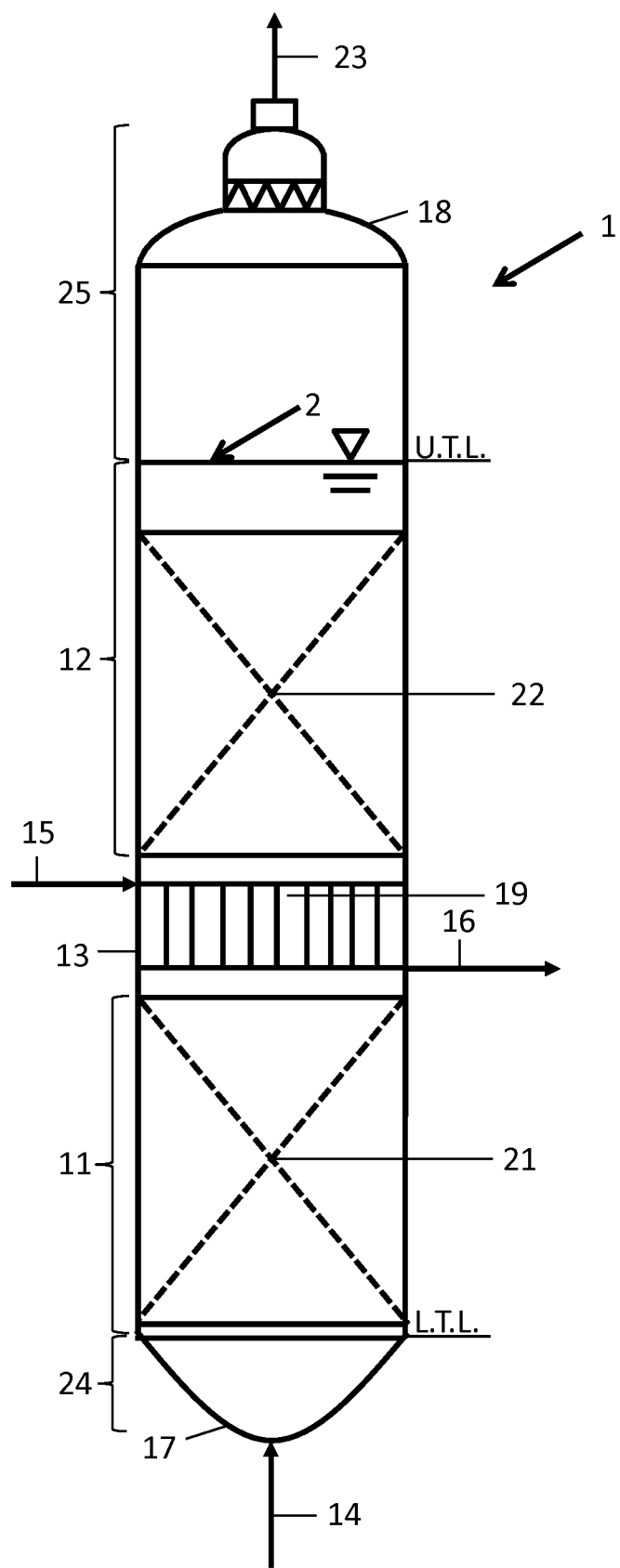

SLURRY BUBBLE COLUMN REACTOR FOR A FISCHER-TROPSCH PROCESS

CROSS-REFERENCE TO RELATED APPLICATIONS

This application is a national stage application under 35 U.S.C. 371 of International Patent Application Serial No. PCT/EP2017/062084, entitled "Slurry Bubble Column Reactor for a Fischer-Tropsch Process," filed May 19, 2017, which claims priority from German Patent Application No. DE 10 2016 110 237.7, filed Jun. 2, 2016, the disclosure of which is incorporated herein by reference.

SUMMARY

Various embodiments provide a slurry bubble column reactor for converting a gas mixture comprising carbon monoxide and hydrogen into liquid hydrocarbons featuring a slurry bed of catalyst particles, an inlet conduit for feeding the gas mixture into the slurry bed, a filtration zone for separating the liquid hydrocarbons from the catalyst particles and an liquid outlet conduit for withdrawing the separated hydrocarbons from the filtration zone, wherein the filtration zone is situated in the slurry bubble column reactor such that the slurry bed is found in a first and a second heat exchange zone with the filtration zone arranged between the first and the second heat exchange zone.

In some embodiments, each heat exchange zone features a separate heat exchanger.

In some embodiments, the slurry bubble column reactor comprises a bottom zone and the inlet conduit is fluently connected to the bottom zone.

In some embodiments, the first heat exchange zone is situated next to the bottom zone of the slurry bubble column reactor.

In some embodiments, the filtration zone comprises at least one hollow and enclosed filter element and at least one rinsing conduit for cleaning the filter element.

In some embodiments, the slurry bubble column reactor features a gas outlet conduit on top to withdraw gaseous products and unreacted synthesis gas.

In some embodiments, the filtration zone features a diameter similar to the slurry bubble column reactor diameter and that the beginning of the filtration zone measured from the lower tangent line (L.T.L) of the slurry bubble column reactor is between 20 and 60% of the height of the slurry bubble column reactor from the lower tangent line (L.T.L.) to the upper tangent line (U.T.L.).

In some embodiments, the heat exchange zones feature a diameter similar to the slurry bubble column reactor diameter and that the height of the first heat exchange zone is between 75 and 150% of the height of the second heat exchange zone.

Various embodiments provide a process for converting a gas mixture comprising carbon monoxide and hydrogen into liquid hydrocarbons, when the gas mixture is fed into a slurry bed in a slurry bubble column reactor, where at least part of the gas mixture is converted into liquid hydrocarbons on the catalyst particles in the slurry bed, wherein the obtained liquid hydrocarbons are separated from the catalyst particles in a filtration zone located in the slurry bubble column reactor and wherein at least parts of the separated liquid hydrocarbons are withdrawn from the filtration zone, wherein the gas mixture is converted in two heat exchange zones fluently connected via the filtration zone only.

In some embodiments, the temperature inside the slurry bubble column reactor is between 200 and 260° C. and/or the pressure inside the slurry bubble column reactor is between 10 and 50 bar g.

Various embodiments provide a use of a slurry bubble column reactor according to the disclosure for performing a Fischer-Tropsch process.

BRIEF DESCRIPTION OF THE DRAWINGS

FIG. 1 shows a slurry bubble column reactor according to various embodiments.

DETAILED DESCRIPTION

The disclosure relates to a slurry bubble column reactor (SBCR) for converting a gas mixture comprising carbon monoxide and hydrogen into liquid hydrocarbons, featuring a slurry bed of catalyst particles, an inlet conduit for feeding the gas mixture into the slurry bed, a filtration zone for separating the liquid hydro-carbons from the catalyst particles and an liquid outlet conduit for withdrawing the separated liquid hydrocarbons from the filtration zone. Further, the disclosure also deals with a process for operating this slurry bubble column reactor.

The Fischer-Tropsch (FT) process for converting carbon monoxide and hydrogen to liquid motor fuels and/or wax has been known since the 1920s. The process, a key component of gas to liquids technology, produces a synthetic lubrication oil and synthetic fuel, typically from coal, natural gas or biomass. A variety of catalysts can be used for the Fischer-Tropsch-Process, but the most common are based on the transmission metals iron and cobalt. The so-called high temperature Fischer-Tropsch (HTFT) process is operated at temperatures between 300 and 350° C. and uses typically an iron based catalyst. The low temperature Fischer-Tropsch (LTFT) process is operated at lower temperatures in the range between 150 and 300° C. and uses iron or cobalt based catalysts mostly. Typical pressure range is from 1 to 50 bar g. A variety of synthesis gas compositions can be used; the ratio of $H_2$:CO depends on the used catalyst.

Efficient removal of heat from the reactor is the basic need of the Fischer-Tropsch reactors and, therefore, these reactions are characterized by high exothermicity. Four types of reactors are often used, namely the multi tubular fixed bed reactor, the entrained flow reactor, the fluid bed circulating catalyst reactor and the slurry bubble column reactor.

The current disclosure belongs to the use of a slurry bubble column as a reactor, wherein the heat removal is done by internal cooling coils. Synthesis gas is bubbled through the waxy products and finely divided catalyst which is suspended in the liquid medium. This also provides agitation of the contents of the reactor. Catalyst particle size reduces diffusional heat and mass transfer limitations. However, separation of the product from the catalyst is a problem.

Basically, the product separation can be done externally as well as internally. A possible external separation is shown in US 2009/0069450 A1. Therein, a catalytic reactor is fluently connected with at least two slurry loops for separating the slurry therein. Though, the external separation has the disadvantage that catalyst is not cooled in the external loop, but is still reactive. Therefore, the catalyst can be harmed by local hot spots due to exothermic reaction. Further, external catalyst deposits could be formed by sedimentation.

One possibility of an internal wax separation in a slurry bubble column reactor is described in EP 0 609 079 A1, wherein gaseous educts are fed into a slurry bed of solid particles suspended in a liquid. The educts react in a heat exchange zone as they pass upwardly through the slurry bed and form liquid and gaseous products. The heat exchange zone is heated with one heat exchanger. Above the heat exchange zone, a filtration zone is installed in the slurry bubble column, so the liquid product passes through a filtration medium in first direction and solid particles are filtered on the filtration medium and form a cake of particles. In periods, the passage of liquid products through the filtering medium is interrupted and filtering medium is back flushed by passing a flushing fluid through the filtering medium in a direction opposite to the flow direction of the liquid product. Thereby, the filtering cake is dislodged from the filtering medium.

Further, also document EP 1 940 540 describes a slurry bubble column wherein the separation of the liquid products and the solid catalyst particle takes place inside the column. Thereby, a filtering pressure differential across filtering media of a whole of filter element and any filter cake build up on the outside of that filter element is applied to obtain and withdraw a filtrate from inside the filter element and, therefore, obtaining the liquid product. In parallel or followed by, the inlet of the filter element is charged with a rinsing fluid to clean the inside of the filter of catalyst fines. Afterwards, a back pressure differential opposite to the filtering pressure differential is applied to force a back flushing fluid in an opposite direction across the filter media to dislodge filter cake built up.

However, all known slurry bubble column reactors with a filtration zone inside the slurry bubble column reactor show this filtration zone in the upper part of the column, whereby the heat exchange zone is located below this filtration zone. So, the whole heat exchange zone can be cooled with one heat exchanger, which reduces the invest costs and enables a more easy process control.

However, this location of the filtration zone has the big disadvantage that in case of a failure in the feeding of the synthesis gas supply to the reactor, the filter can fall dry due to a decrease of the slurry level or if in an trip-case nitrogen is introduced into the reactor to avoid a full collapse of the reactor slurry, the filter can be exposed to unreacted synthesis gas. However, the contact with hydrogen and carbon monoxide can lead to sintering of the filter surface, decreasing the active filtration area, which reduces the liquid wax product removal capability of the reactor and, thereby, also the liquid wax product production capability.

The current disclosure solves this problem with a slurry bubble column reactor with the features as described herein.

Said slurry bubble column reactor for converting a gas mixture comprising carbon monoxide and hydrogen into liquid hydrocarbons, often also indicated as wax, features a slurry bed of catalyst particles. It further shows an inlet conduit for feeding the gas mixture into the slurry bed, a filtration zone for separating the liquid hydrocarbons from the catalyst particle and a liquid outlet conduit for restoring the separated liquid hydrocarbons from the filtration zone.

According to the disclosure, the filtration zone is situated in the slurry bubble column reactor such that the slurry bubble column reactor is divided into a first and a second heat exchange zone completely separated from each other by the filtration zone. Thereby, it is possible that in all cases of emergency, the filtration zone is completely submerged into the slurry bed and, therefore, protected from reactions with synthesis gas.

Since the Fischer-Tropsch reactions are exothermic, the heat of reaction has to be discharged by heat exchangers inside the slurry bubble column reactor to maintain the reactor temperature, which is why both heat exchange zones feature separate heat exchangers. The higher invest costs will be amortized due to the longer operating life.

In a further embodiment of the disclosure, the inlet conduit is connected to the three phase slurry bubble column reactor such that the synthesis gas used as an educt is fed into the first heat exchange zone only. Thereby, unwanted streams in the slurry bubble column reactor due to the fact that there is more than one feeding inlet can be avoided.

In various embodiments, the first heat exchange zone is the heat exchange zone next to the bottom of the slurry bubble column reactor. Thereby, the liquid reaction product as well as gas bubbles of the gaseous products can flow upwardly through the slurry bubble column reactor. Various embodiments feature an inlet, which is at the bottom of the column.

Further, the filtration zone comprises at least one hollow and enclosed filter element and at least one rinsing conduit for cleaning the filter element. Thereby, it is possible to feed in a rinsing fluid whereby the rinsing fluid may consist of any hydrocarbon liquids essential free from fine particles, such as the rinsing fluid consists of liquid products from the Fischer-Tropsch reactions like filtered liquid wax or condensed gaseous products.

The filtration step is followed by a rinsing step. The inside of the filter element is then charged with a rinsing liquid. The charging pressure of the rinsing liquid should be lower or similar to the pressure at the outside of the filter element in the slurry phase to minimize transport of the rinsing liquid across the filter element into the slurry phase. The volume of the rinsing liquid should be selected to be similar or greater than the inside volume of the filter element. The rinsing liquid and any fines particles collected inside the filter element is then removed from the filter element through a filter element liquid outlet conduit.

The rinsing step is followed by a backflushing step to force transport of the backflushing fluid across the filter element to dislodge filter cake build-up. Afterwards, normal filtration can resume with or without any waiting time.

Further, the slurry bubble column reactor features a gas outlet conduit on top of the slurry bubble column reactor to withdraw product gases and unreacted synthesis gas from there.

In various embodiments of the disclosure, the filtration zone features a diameter similar to the slurry bubble column reactor diameter. This should make clear that the filtration zone extends over the circular area inside the column. Moreover, the beginning of the filtration zone measured from the lower tangent line (L.T.L) of the slurry bubble column reactor is between 20 and 60% of the height of the slurry bubble column reactor from the lower tangent line (L.T.L) to the upper tangent line (U.T.L).

Moreover, also the heat exchange zones feature a diameter similar to the slurry bubble column reactor diameter and the height of the first heat exchange zone is between 75 and 150% of the height of the second heat exchange zone. Especially all features concerning diameter and heights of the three zones together fulfill the criterion that in case of fully collapsing slurry without any gas hold up, the filter is still fully submerged in the reactor slurry.

The disclosure further covers a process with the features as described herein.

This process is directed to convert a gas mixture comprising carbon monoxide and hydrogen into liquid hydrocarbons, wherein the gas mixture is fed into a slurry bed in a slurry bubble column reactor. At least parts of the gas mixture are converted into liquid hydrocarbons on catalyst particles in the slurry bed. The obtained liquid hydrocarbons are separated from the catalyst particles in a filtration zone located inside the slurry bubble column reactor and at least parts of the separated liquid hydrocarbons are withdrawn from the filtration zone.

According to the disclosure, the gas mixture is converted in two heat exchange zones fluently connected via the filtration zone only. Thereby, it is possible to ensure that the whole filter is submerged into the slurry even in cases of emergency and, therefore, protected from the reactions with the reactive synthesis gas.

Various embodiments of this process is that the temperature inside the slurry bubble column reactor is between 200 and 260° C. and/or the pressure inside the slurry bubble column reactor is between 10 and 50 bar g. Higher temperatures lead to faster reactions and higher conversion rates, but also too high temperatures will damage the catalyst.

Increasing the pressure leads also to higher conversion rates but can also lead to a catalyst deactivation e.g. via coke formation.

In an additional aspect, the disclosure also pertains to the use of a slurry bubble column reactor according to the disclosure as well as according to the specific embodiments as described above for performing a Fischer-Tropsch process.

Various embodiments, advantages and possible applications of the disclosure can also be taken from the following description of the drawing. All features described and/or illustrated form the subject matter of the disclosure per se or in any combination, independent of their inclusion in the claims or their back reference.

FIG. 1 shows a slurry bubble column reactor according to the disclosure.

Via inlet conduit 14 a feed comprising carbon monoxide and hydrogen is fed into a bottom zone 24 of the slurry bubble column reactor 1. The bottom zone 24 is defined from the bottom 17 of the slurry bubble column reactor 1 up to its lower tangent line (L.T.L). The slurry bubble column reactor 1 is filled with a slurry bed 2 comprising suspended catalyst particles. Above the slurry bed is a disengagement zone 25. Further, a heat exchanger 21 is installed into a first heat exchange zone 11 to cool the slurry bed 2 which is heated due to the exothermic reactions taking place therein.

At least parts of the synthesis gas react on the catalyst particles, whereby at least one liquid product, often called wax, and gaseous products are formed. The liquid and gaseous products enter a filtration zone 13, whereby the solid catalyst particles are mainly separated in form of a filter cake on at least one filter element 19 inside the filtration zone 13.

Above the filtration zone 13, a second heat exchange zone 12 is located. The second heat exchange zone 12 also features a separate heat exchanger 22 to cool this part of the slurry bed 2. By entering the filtration zone 13 from the second heat exchange zone 12, also catalyst particles are separated at the at least one filter element 19 of the filtration zone 13.

As a result, the liquid product inside the filter element 19 is mainly free of catalyst particles and can be withdrawn via the liquid outlet conduit 16.

To clean the inside of the filter element 19, it is possible to feed a rinsing liquid via the rinsing conduit 15 into the filter element 19. The rinsing liquid can be withdrawn via the liquid outlet conduit 16.

After the rinsing step, a backflushing step is performed to dislodge the filter cake from the filter element 19 by a forced flow of the backflushing fluid from the inside of the filter element 19 into the slurry bed 2.

The slurry bubble column reactor 1 features a bottom 17 and a top 18. Gaseous products and unreacted synthesis gas can be withdrawn via the gas outlet conduit 23 from the top of the slurry bubble column reactor 1.

In some embodiments, it can be essential for the disclosure that the second heat exchange zone 12 above the filtration zone 13 is designed such that also in cases of emergency with a reduced gas hold up, the filtration zone 13 is fully submerged into the slurry bed 2.

REFERENCE LIST

1 slurry bubble column reactor
2 slurry bed
11 first heat exchange zone
12 second heat exchange zone
13 filtration zone
14 inlet conduit
15 rinsing conduit
16 liquid outlet conduit
17 bottom
18 top
19 filter element
21, 22 heat exchanger
23 gas outlet conduit
24 bottom zone
25 disengagement zone
L.T.L lower tangent line
U.T.L upper tangent line

The invention claimed is:

1. A slurry bubble column reactor for converting a gas mixture comprising carbon monoxide and hydrogen into liquid hydrocarbons featuring a slurry bed of catalyst particles, an inlet conduit for feeding the gas mixture into the slurry bed, a filtration zone for separating the liquid hydrocarbons from the catalyst particles and a liquid outlet conduit for withdrawing the separated hydrocarbons from the filtration zone, wherein the filtration zone is situated in the slurry bubble column reactor such that the slurry bed is found in a first and a second heat exchange zones with the filtration zone arranged between the first and the second heat exchange zones.

2. The slurry bubble column reactor according to claim 1, wherein each heat exchange zone features a separate heat exchanger.

3. The slurry bubble column reactor according to claim 1, wherein the slurry bubble column reactor comprises a bottom zone and the inlet conduit is fluently connected to the bottom zone.

4. The slurry bubble column reactor according to claim 3, wherein the first heat exchange zone is situated next to the bottom zone of the slurry bubble column reactor.

5. The slurry bubble column reactor according to claim 1, wherein the filtration zone comprises at least one hollow and enclosed filter element and at least one rinsing conduit for cleaning the filter element.

6. The slurry bubble column reactor according to claim 1, wherein the slurry bubble column reactor features a gas outlet conduit on top to withdraw gaseous products and unreacted synthesis gas.

7. The slurry bubble column reactor according to claim 1, wherein the filtration zone features a diameter similar to the slurry bubble column reactor diameter and that the beginning of the filtration zone measured from a lower tangent line (L.T.L.) of the slurry bubble column reactor is between 20% and 60% of the height of the slurry bubble column reactor from the lower tangent line (L.T.L.) to an upper tangent line (U.T.L.).

8. The slurry bubble column reactor according to claim 1, wherein the heat exchange zones feature a diameter similar to the slurry bubble column reactor diameter and that the height of the first heat exchange zone is between 75% and 150% of the height of the second heat exchange zone.

9. A process for converting a gas mixture comprising carbon monoxide and hydrogen into liquid hydrocarbons, when the gas mixture is fed into a slurry bed in a slurry bubble column reactor, where at least part of the gas mixture is converted into liquid hydrocarbons on the catalyst particles in the slurry bed, wherein the obtained liquid hydrocarbons are separated from the catalyst particles in a filtration zone located in the slurry bubble column reactor and wherein at least parts of the separated liquid hydrocarbons are withdrawn from the filtration zone, wherein the gas mixture is converted in two heat exchange zones fluently connected via the filtration zone only.

10. The process according to claim 9, wherein the temperature inside the slurry bubble column reactor is between 200° C. and 260° C. and/or the pressure inside the slurry bubble column reactor is between 10 and 50 bar g.

* * * * *